United States Patent [19]
Saito

[11] Patent Number: 5,270,899
[45] Date of Patent: Dec. 14, 1993

[54] ERASING APPARATUS
[75] Inventor: Yukio Saito, Tokyo, Japan
[73] Assignee: Sanix Corporation, Tokyo, Japan
[21] Appl. No.: 869,059
[22] Filed: Apr. 16, 1992

Related U.S. Application Data
[63] Continuation-in-part of Ser. No. 435,760, Nov. 14, 1989, abandoned.

[30] Foreign Application Priority Data
Nov. 14, 1988 [JP] Japan .................. 63-287409

[51] Int. Cl.$^5$ .............................................. H01F 13/00
[52] U.S. Cl. ........................... 361/151; 361/267; 361/149; 335/284
[58] Field of Search .............. 361/143, 149, 150, 151, 361/267; 335/284; 360/66, 118

[56] References Cited
U.S. PATENT DOCUMENTS

| | | | |
|---|---|---|---|
| 3,506,884 | 4/1970 | McKinley | 361/151 |
| 4,470,094 | 9/1984 | Armond et al. | 361/149 |
| 4,551,782 | 11/1985 | Seely et al. | 361/151 |
| 4,672,345 | 6/1987 | Littwin et al. | 335/284 |
| 4,730,230 | 3/1988 | Helfrick | 361/151 |
| 4,897,759 | 1/1990 | Becker | 361/151 |

FOREIGN PATENT DOCUMENTS
61-170904 8/1986 Japan.
1-144202 6/1989 Japan.

*Primary Examiner*—A. D. Pellinen
*Assistant Examiner*—Peter Ganjoo
*Attorney, Agent, or Firm*—Jacobson, Price, Holman & Stern

[57] ABSTRACT

An apparatus for erasing information recorded on a magnetic tape wound into a roll having a diameter. The apparatus comprises an erasing coil wound in the form of a solenoid defining a space therein. The space has a width shorter than the diameter of the magnetic tape roll and a length longer than the diameter of the magnetic tape roll. The magnetic tape roll is moved intermittently to different erasing positions in a predetermined sequence so that the magnetic tape roll has different portions placed in the space at the respective erasing positions. A ringing signal is applied to the erasing coil to provide a magnetic field in the space for erasing information recorded on the magnetic tape roll each time the magnetic tape roll is placed at one of the erasing positions.

11 Claims, 10 Drawing Sheets

FIG. 1

PRIOR ART

ERASING APPARATUS

This application is a continuation-in-part of application Ser. No. 07/435,760, filed Nov. 14, 1989 now abandoned.

BACKGROUND OF THE INVENTION

This invention relates to an erasing apparatus for erasing information recorded on an analog or digital magnetic tape wound into a roll.

Erasing apparatus of this type have already been employed. However, conventional erasing apparatus have had serious disadvantages such as the use of a large-sized erasing coil as described later.

SUMMARY OF THE INVENTION

Therefore, it is a main object of the invention to provide an improved erasing apparatus which can use a small-sized erasing coil consuming far less power.

There is provided, in accordance with the invention, an erasing apparatus for erasing information recorded on a magnetic tape wound into a roll having a diameter. The erasing apparatus comprises an erasing coil wound in the form of a solenoid defining a space therein. The space has a width shorter than the diameter of the magnetic tape roll and a length longer than the diameter of the magnetic tape roll. The apparatus also comprises means for moving the magnetic tape roll intermittently to different erasing positions in a predetermined sequence so that the magnetic tape roll has different portions placed in the space at the respective erasing positions. A means is provided for producing a ringing signal to the erasing coil to provide a magnetic field in the space so as to perform one erasing operation cycle for erasing information recorded on the magnetic tape roll each time the magnetic tape roll is placed at one of the erasing positions.

BRIEF DESCRIPTION OF THE DRAWINGS

This invention will be described in greater detail by reference to the following description taken in connection with the accompanying drawings in which.

DETAILED DESCRIPTION OF THE PREFERRED EMBODIMENT

Figure 1:
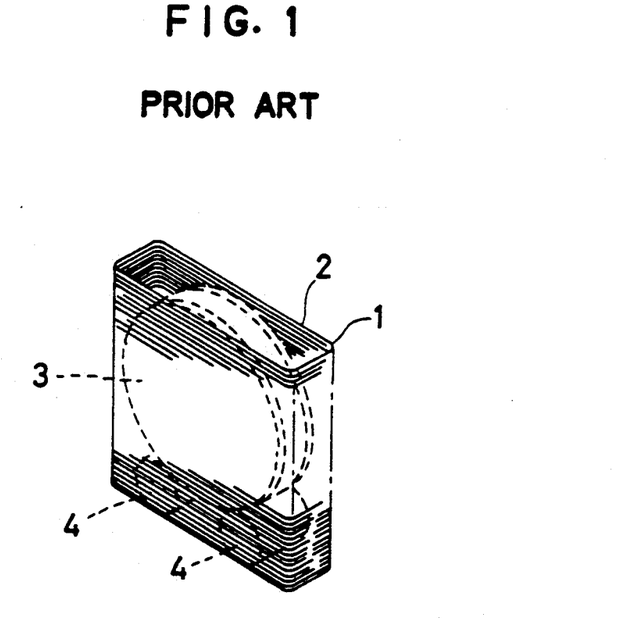
FIG. 1 is a perspective view of a prior art erasing apparatus.
Figure 2:
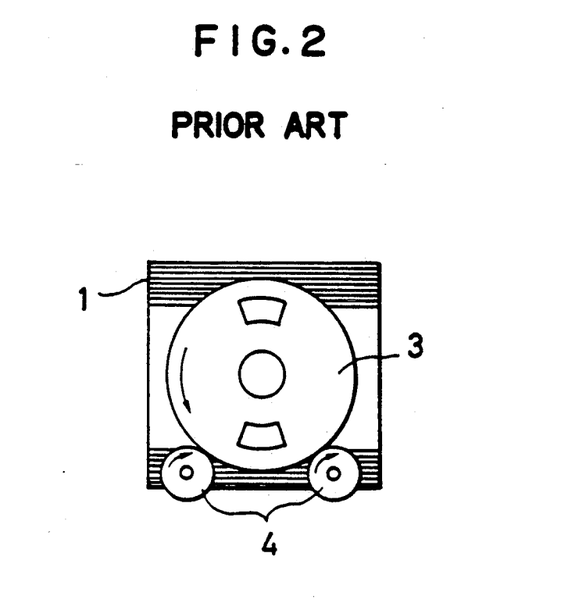
FIG. 2 is an elevational view of the prior art erasing apparatus.
Figure 3:
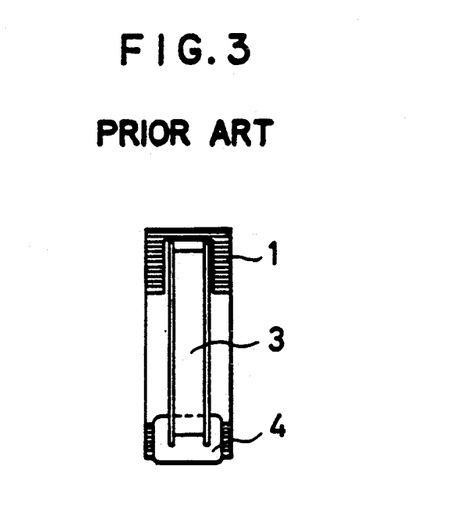
FIG. 3 is a side view of the prior art erasing apparatus.

Prior to the description of the preferred embodiment of the present invention, the prior art erasing apparatus of FIGS. 1 to 3 is briefly described in order to provide a basis for a better understanding of the difficulties attendant therewith.

The prior art erasing apparatus includes an erasing coil 1 having a space 2 for receipt of a roll of magnetic tape 3 to be handled. A ringing signal, which has an envelope decreasing with the lapse of time, is applied to the erasing coil 1 to provide a desired magnetic field for erasing the information recorded on the magnetic tape 3 placed in the space 2. Since the erasing coil 1 has a maximum erasing efficiency for the information recorded on magnetic tape portions substantially in parallel with the magnetic flux, it is required to rotate the magnetic tape roll in a direction within the space 2 while applying the ringing signal to the erasing coil 1 in order to erase the information recorded on the entire area of the magnetic tape 3. For this purpose, the erasing apparatus also includes a pair of rollers 4 for rotating the magnetic tape roll within the space 2. This type of erasing apparatus is disclosed in Japanese Patent Kokai No. 61-170904.

However, such a conventional erasing apparatus employs a large-sized erasing coil wound to have a space sized large enough to receive the overall size of the magnetic tape roll. The erasing coil has a great electric resistance and thus requires current of a great magnitude to provide a sufficient magnetic field for erasing the information recorded on the magnetic tape. This results in a space and power consuming erasing apparatus.

Figure 4:
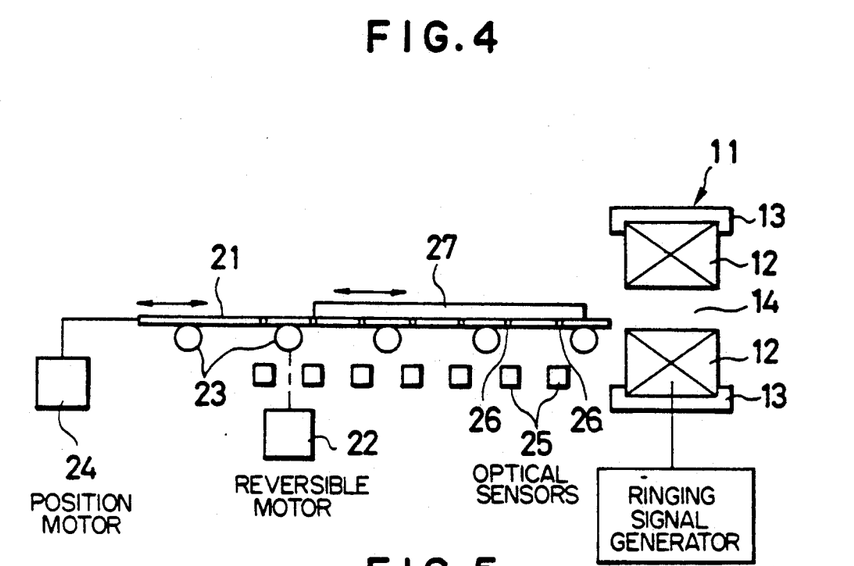
FIG. 4 is a schematic diagram showing one embodiment of an erasing apparatus made in accordance with the invention.
Figure 5:
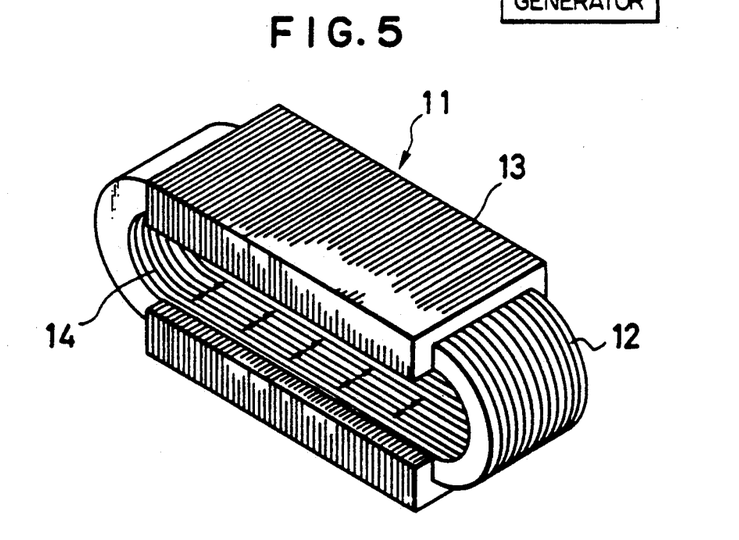
FIG. 5 is a perspective view of the erasing section used in the erasing apparatus of FIG. 4.

Referring to FIG. 4, there is illustrated an erasing apparatus embodying the invention. The erasing apparatus includes an erasing section 11 for erasing the information recorded on a roll of magnetic tape which may be wound around a reel or the like. The erasing section 11 includes an erasing coil 12 wound in the form of a solenoid defining an elongated space 14 having a width much (for example, several times) shorter than the diameter of the magnetic tape roll and a length longer than the diameter of the magnetic tape roll so that the magnetic tape roll can move through the space 14. A ringing signal is applied to the erasing coil 12 for producing a magnetic field in the space 14. A pair of cores 13 having high permeability are optionally provided on the opposite sides of the erasing coil 12, as best shown in FIG. 5, for increasing the magnetic field intensity in the space 14.

The erasing apparatus also includes a slider 21 placed on a plurality of feed rollers 23. The slider 21 is formed with a number of through-holes 26 arranged in a line. The slider 21 is shown as carrying a magnetic tape roll 27 placed thereon at a predetermined position. The numeral 22 designates a motor for driving one or more feed rollers 23 in a first direction moving the slider 21 toward the erasing section 11 and in a second direction moving the slider 21 away from the erasing section 11. The position of the slider 21 with respect to its initial position is sensed by a position sensor 24. The position sensor 24 may be of the type including an encoder for producing a series of pulses, the number of which corresponds to the displacement of the slider 21 from the initial position. In order to measure the diameter of the magnetic tape roll 27 placed on the slider 21, optical sensors 25 are located at positions just below the respective holes 26 when the slider 21 is placed at the initial position shown in FIG. 4. Each of the optical sensors 25 includes a light emission element for emitting light toward the corresponding hole 26 and a light receipt element for producing a signal indicative of the intensity of the light incident thereon. The light incident on the light receipt element has a great intensity when the corresponding hole 26 is closed by the magnetic tape roll 27 and a small intensity when the corresponding hole 26 is open. The position sensor 24 and the optical sensors 25 are connected to a control unit 32 (see FIG. 6) which may employ a microcomputer.

Figure 6:
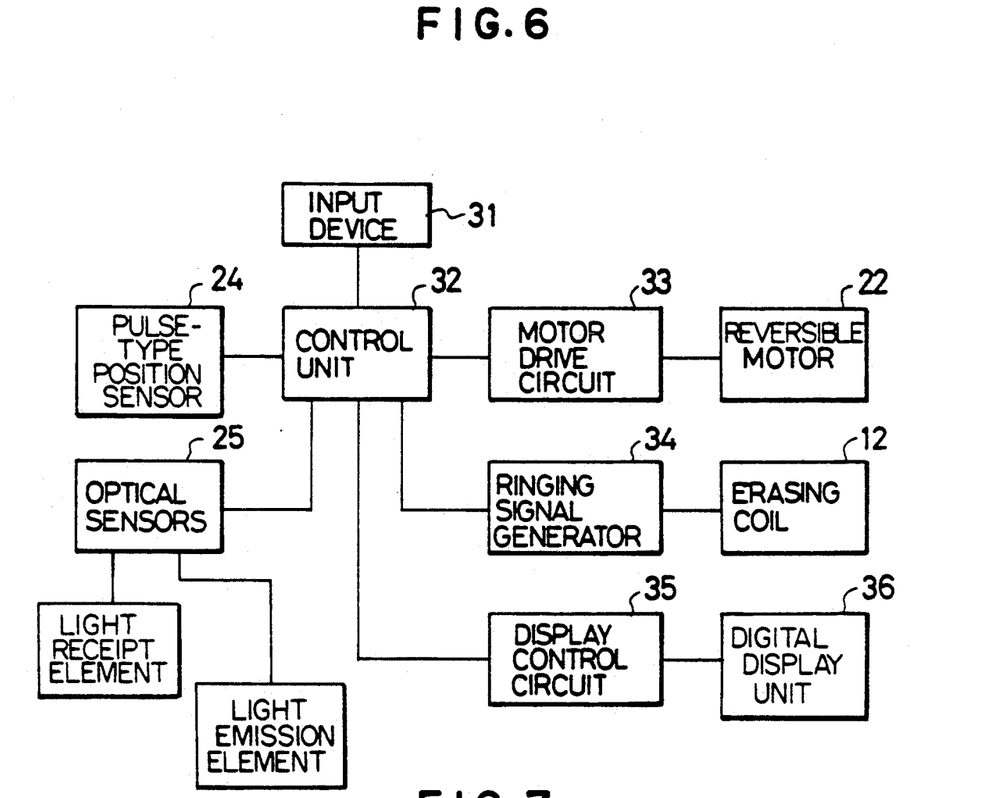
FIG. 6 is a block diagram showing significant components used in the erasing apparatus of FIG. 4.
Figure 7:
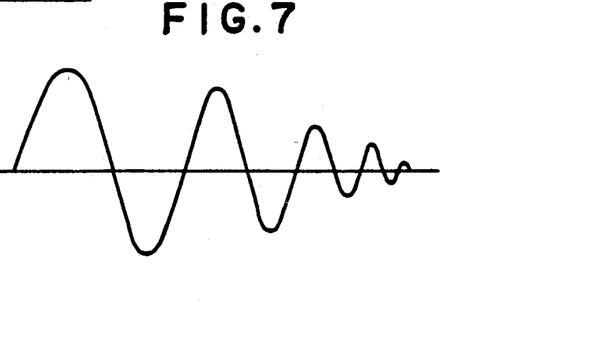
FIG. 7 is a graph showing the waveform of the ringing signal applied to the erasing coil.

Referring to FIG. 6, the control unit 32 receives signals from the optical sensors 25 for detecting the diameter of the magnetic tape roll 27 placed on the slider 21. The control unit 32 calculates a required number of erasing positions by dividing the detected, diameter of the magnetic tape roll 27 by the width of the space 14 of the erasing coil 12. The control unit 32 determines the erasing positions based on the calculated erasing position number. The control unit 32 produces a control signal to a motor drive circuit 33 which thereby controls the motor 22 in a manner to bring the magnetic tape roll 27 to the determined erasing positions in a predetermined sequence. The control unit 32 senses these erasing positions based on the signal fed thereto from the position sensor 24. The control unit 32 produces a control signal to a ringing signal generator 34 which thereby produces a ringing signal to the erasing coil 12 to provide a magnetic field in the space 14 of the erasing coil 12 so as to perform one cycle of erasing operation for erasing information recorded on the magnetic tape roll each time the magnetic tape roll 27 is placed at one of the erasing positions. The ringing signal has an envelope decreasing with the lapse of time, as shown in FIG. 7. The control unit 32 produces a control signal causing a display control circuit 35 to display a digit corresponding to the calculated erasing position number on a display unit 36. The control unit 32 decreases the displayed digit each time one erasing operation cycle is completed as sensed by the position sensor 24 to indicate the number of the remaining erasing operation cycles.

The control unit 32 receives an additional input from an input device 31 having a push button pad provided with a number of push buttons for manually entering various kinds of information to the control unit 32. The push buttons include numerical digit (0-9) push buttons and a start button. The numerical digit push buttons are used in manually inputting a desired number of erasing positions. In this case, the optical sensors 25 may be removed. When the start button is depressed, the input device 31 produces a start command signal to the control unit 32 which thereby starts the erasing operation.

FIGS. 10A, 10B, 10C and 10D illustrate a flow chart which indicates the logic in the control unit 32. Specifically, the schematic flow chart indicates that the diameter of the tape roll 27 is detected or measured and that the number of erasing positions are calculated and displayed after the diameter has been detected and that the driving motor 22 is operated for movement of the tape roll to a first erasing position and then to subsequent erasing positions thus establishing that the tape roll 27 is moved intermittently as opposed to continuously. Further, the flow chart indicates that a ringing signal is produced after the tape roll 27 has reached a predetermined position and that the driving motor 22 is operated in a second direction subsequently to the ringing signal. The flow chart also indicates that the calculated erasing position number is displayed and that the displayed digit decreases and indicates the repetitive production of a ringing signal, decreasing displayed digit and movement of the tape roll.

Figure 8:
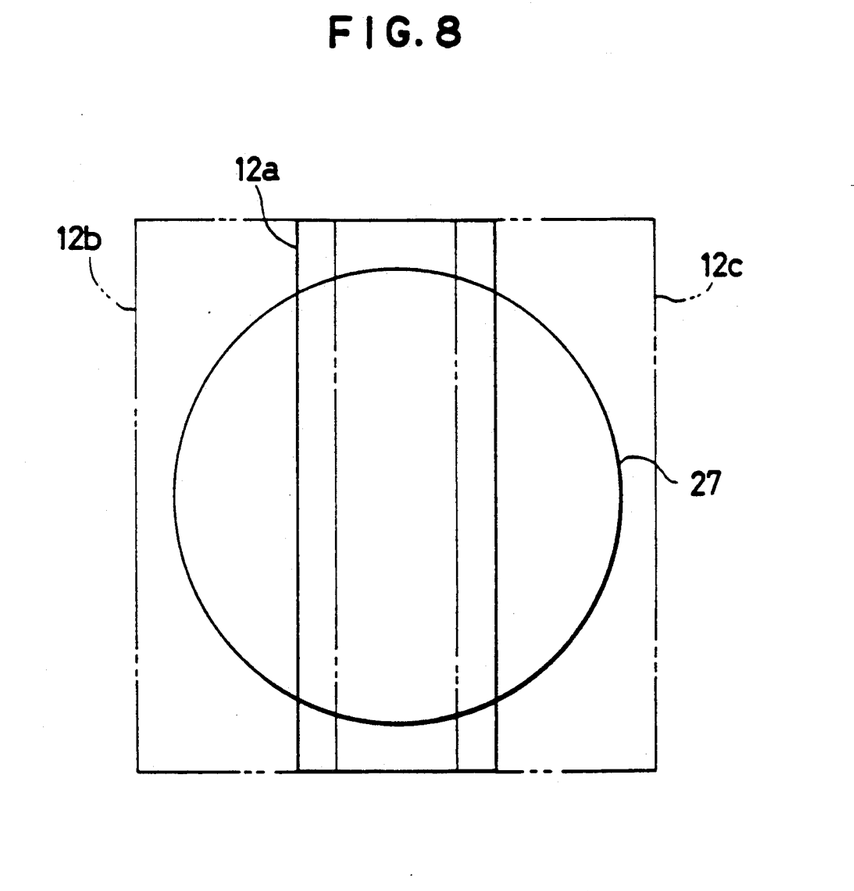
FIG. 8 is a plan view used in explaining the positions of the magnetic tape roll with respect to the erasing coil at respective erasing positions.

The operation is as follows:

First of all, a magnetic tape roll 27 is placed at a predetermined position on the slider 21. The control unit 32 detects the diameter of the magnetic tape roll 27 based on the signals fed thereto from the optical sensors 25. The control unit 32 calculates a required number of (in the illustrated case three) erasing positions by dividing the detected magnetic tape roll diameter by the length of the space 14 of the erasing coil 12 and determines the erasing positions (in the illustrated case first, second and third erasing positions). When the operator depresses the start button to produce a start command signal from the input device 31, the control unit 32 produces a control signal causing the motor drive circuit 33 to drive the motor 22 in the first direction moving the slider 21 along with the magnetic tape roll 27 to the right, as viewed in FIG. 4. When the slider 21 reaches the first erasing position, the position sensor 24 produces a signal to the control unit 32 which thereby produces a stop signal causing the motor drive circuit 33 to stop the motor 22. At this first erasing position, the magnetic tape roll 27 has a first portion placed in the space 14 of the erasing coil 12, the first portion having a size equal to about one-third of the overall size of the magnetic tape roll 27, as shown in FIG. 8 where the phantom lines 12c indicate the position of the erasing coil 12 with respect to the magnetic tape roll 27 when the slider 21 is at the first erasing position. Following this, the control unit 32 produces a control signal causing the ringing signal generator 34 to produce a ringing signal to the erasing coil 12. As a result, a magnetic field is produced in the space 14 of the erasing coil 12 to erase the information recorded on the first portion of the magnetic tape roll 27. The ringing signal may be produced a predetermined number of times.

Upon completion of this first erasing operation cycle, the control unit 32 produces a control signal causing the motor drive circuit 33 to drive the motor 22 further in the first direction. When the slider 21 reaches the second erasing position, the position sensor 24 produces a signal to the control unit 32 which thereby produces a stop signal causing the motor drive circuit 33 to stop the motor 22. At this second erasing position, the magnetic tape roll 27 has a second portion placed in the space 14 of the erasing coil 12. The second portion has a size equal to about one-third of the overall size of the magnetic tape roll 27, as shown in FIG. 8 where the solid lines 12a indicate the position of the erasing coil 12 with respect to the magnetic tape roll 27 when the slider 21 is at the second erasing position. Following this, the control unit 32 produces a control signal causing the ringing signal generator 34 to produce a ringing signal to the erasing coil 12. As a result, a magnetic field is produced in the space 14 of the erasing coil 12 to erase the information recorded on the second portion of the magnetic tape roll 27. The ringing signal may be produced a predetermined number of times.

Upon completion of this second erasing operation cycle, the control unit 32 produces a control signal causing the motor drive circuit 33 to drive the motor 22 further in the first direction. When the slider 21 reaches the third erasing position, the position sensor 24 produces a signal to the control unit 32 which thereby produces a stop signal causing the motor drive circuit 33 to stop the motor 22. At this third erasing position, the magnetic tape roll 27 has a third portion placed in the space 14 of the erasing coil 12. The third portion has a size equal to about one-third of the overall size of the magnetic tape roll 27, as shown in FIG. 8 where the phantom lines 12b indicate the position of the erasing coil 12 with respect to the magnetic tape roll 27 when the slider 21 is placed at the third erasing position. Following this, the control unit 32 produces a control signal causing the ringing signal generator 34 to produce a ringing signal to the erasing coil 12. As a result, a magnetic field is produced in the space 14 of the erasing coil 12 to erase the information recorded on the third portion of the magnetic tape roll 27. The ringing signal may be produced a predetermined number of times.

Upon completion of this third erasing operation cycle, the control unit 32 produces a control signal causing the motor drive circuit 33 to drive the motor 22 in the second direction moving the slider 21 along with the magnetic tape roll 27 to the left, as viewed in FIG. 4. When the slider 21 reaches its initial position, the position sensor 24 produces a signal to the control unit 32 which thereby produces a stop signal causing the motor drive circuit 33 to stop the motor 22.

Figure 9:
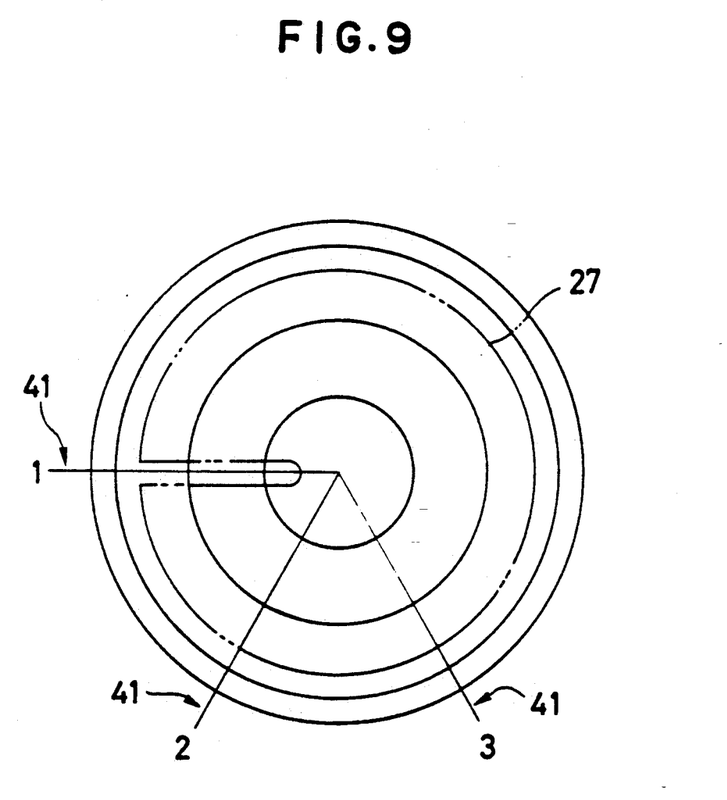
FIG. 9 is a plan view showing reference position marks provided on the slider used in the erasing apparatus of FIG. 4.
Figure 10A:
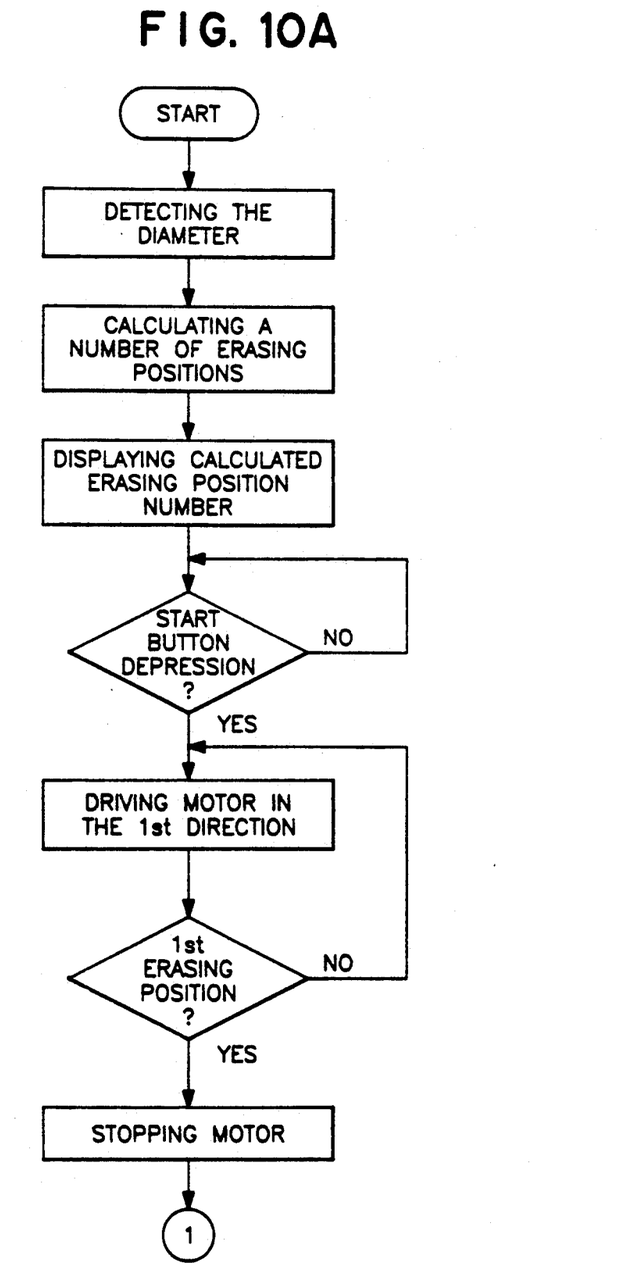
FIGS. 10A-10D illustrate a flow chart which indicates the logic in the control unit.
Figure 10B:
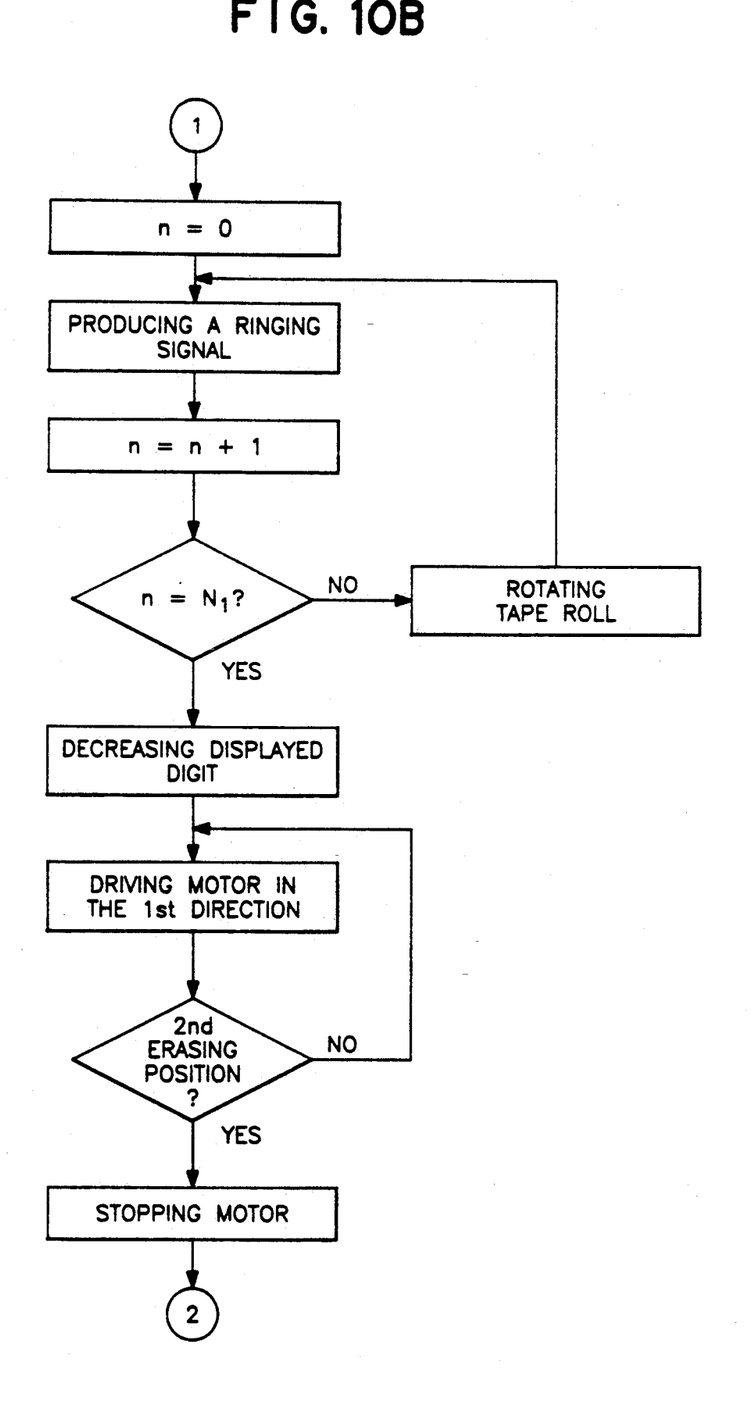
Figure 10C:
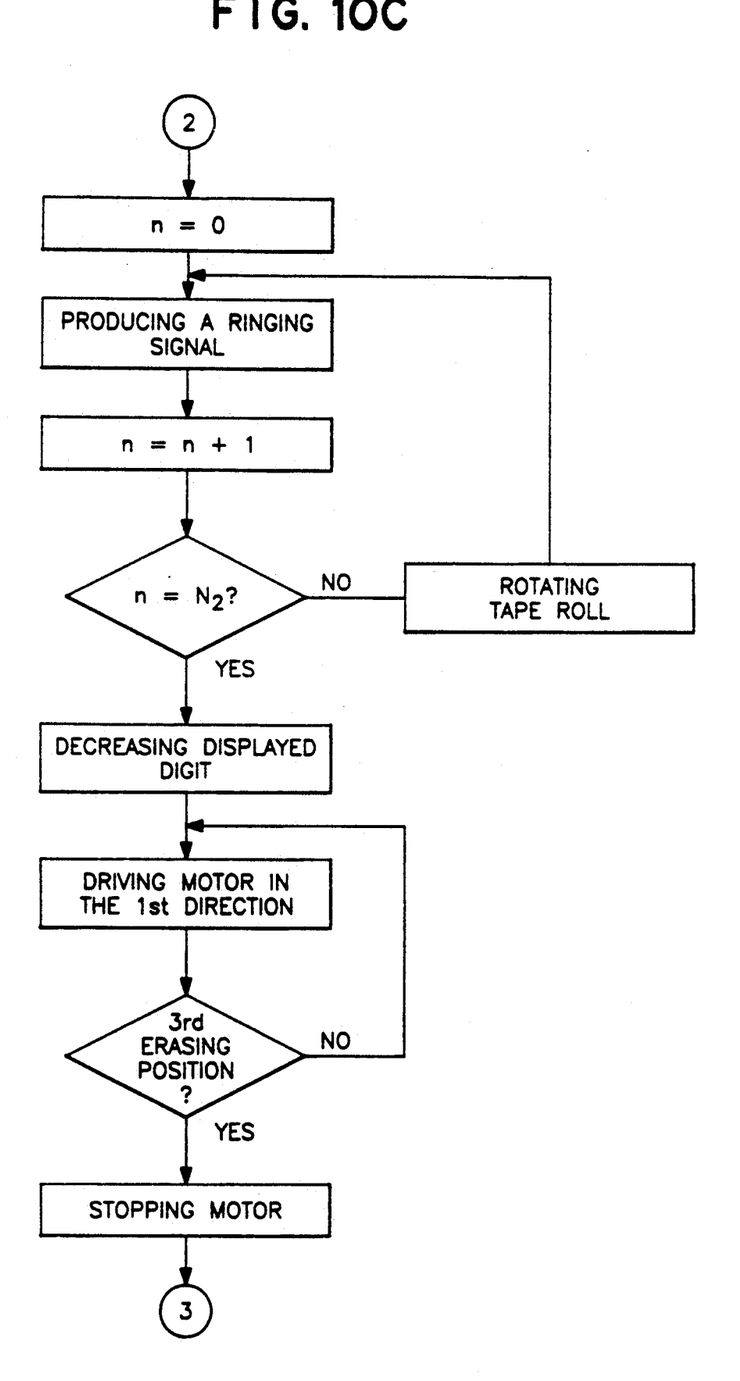
Figure 10D:
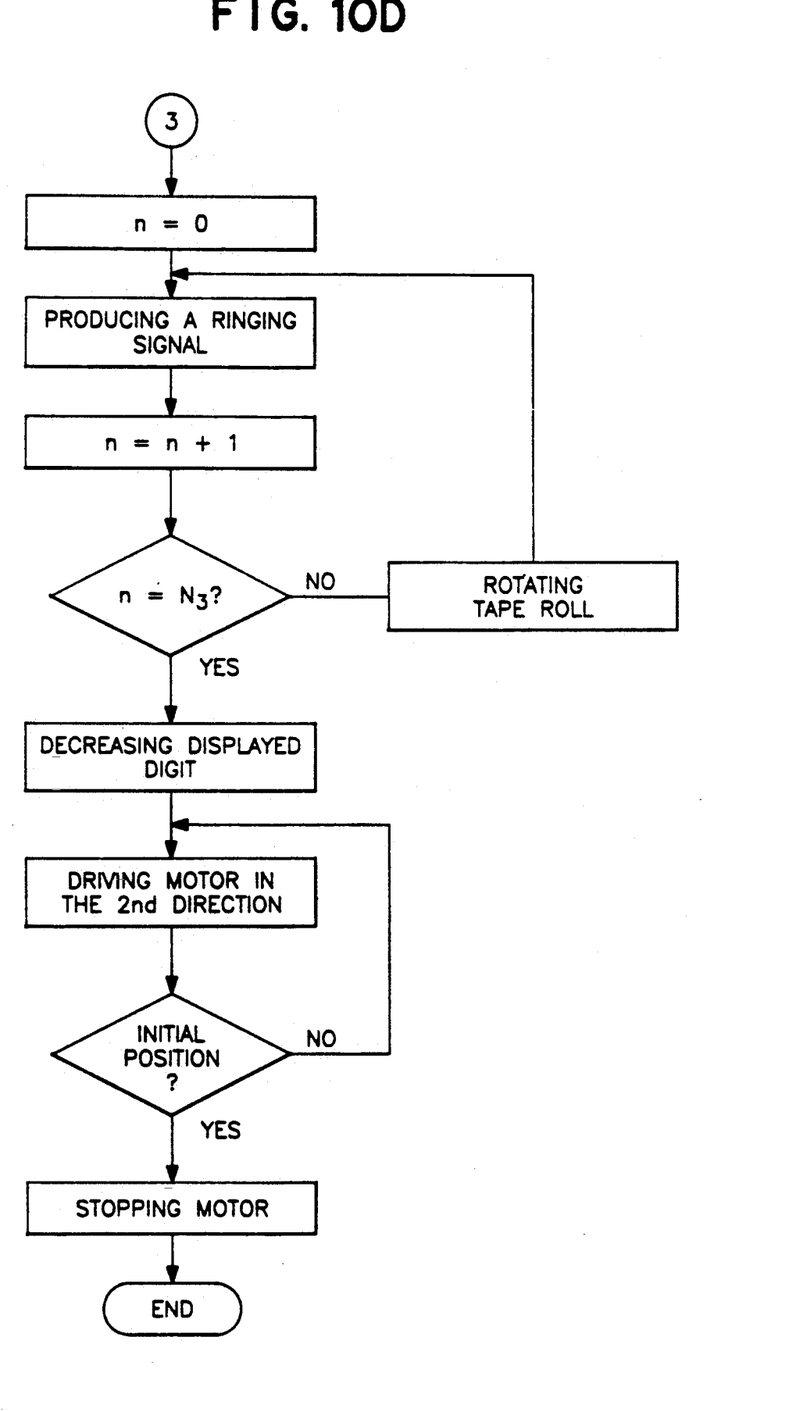

A maximum erasing efficiency is achieved when the direction of the magnetic field produced in the space 14 is in parallel with the direction in which the magnetic tape is magnetized to have information recorded thereon. Therefore, the erasing section 11 can erase the information recorded on the second portion of the magnetic tape roll 27 with higher efficiency as compared to the information recorded on the first and third portions thereof. Although the recorded information can be erased to a sufficient extend if the force of the magnetic field produced in the space 14 has a magnitude overcoming the coercive force maintaining the information on the magnetic tape, it is preferable to increase the force of the magnetic field provided in the space 14 during the first and third erasing operation cycles by increasing the number of times the ringing signal is produced to the erasing coil 12 or by increasing the magnitude of the ringing signal to the erasing coil 12. Alternatively, the ringing signal may be produced at a predetermined number of times to the erasing coil 12 after the magnetic tape roll 27 is rotated manually at a predetermined angle upon completion of each of the erasing operation cycles. In this case, it is preferable to provide marks 41 on the surface portion of the slider 21 on which the magnetic tape roll 27 is placed. The marks 41 are shown in FIG. 9 as including three radially extending reference position lines 1, 2 and 3 which respectively indicates first, second and third positions at which first, second and third erasing operation cycles are to be made in this order. It is appreciated that the magnetic tape roll 27 may be rotated automatically at a predetermined angle upon completion of each of the erasing operation cycles.

What is claimed is:

1. An erasing apparatus for erasing information recorded on a magnetic tape wound into a roll having a diameter, comprising an erasing coil defining a space therein, the space having a width shorter than the diameter of the magnetic tape roll and a length longer than the diameter of the magnetic tape roll, means for moving the magnetic tape roll intermittently in a first direction to different erasing positions in a predetermined sequence so that the magnetic tape roll has different portions placed in the space at the respective erasing positions, means for producing a ringing signal to the erasing coil to provide a magnetic field in the space so as to perform one erasing operation cycle for erasing information recorded on the magnetic tape roll each time the magnetic tape roll is placed at one of the erasing positions, and means for moving the magnetic tape roll in a second direction opposite said first direction subsequent to production of the ringing signal when the tape roll is in the last erasing position of said sequence of erasing positions.

2. The erasing apparatus as claimed in claim 1, wherein the means for moving the magnetic tape roll includes:
 a movable member having a surface portion on which the magnetic tape roll is placed at a predetermined position; and
 means for moving the movable member intermittently in a direction to bring the magnetic tape roll from one of the erasing positions to another upon completion of each erasing operation cycle.

3. The erasing apparatus as claimed in claim 2, wherein the movable member is moved in a direction across the width of the space of the erasing coil.

4. The erasing apparatus as claimed in claim 2, further including means for manually producing a signal indicative of a required number of the erasing positions, and means responsive to the signal for determining the erasing positions based on the required number of the erasing positions.

5. The erasing apparatus as claimed in claim 4, further including means for displaying a digit corresponding to the required number of the erasing positions.

6. The erasing apparatus as claimed in claim 5, further including means for decreasing the displayed digit each time one erasing operation is completed to indicate a number of remaining erasing operation cycles.

7. The erasing apparatus as claimed in claim 2, wherein the surface portion has radially extending reference position marks indicating erasing positions at which respective erasing operation cycles are to be performed.

8. An erasing apparatus for erasing information recorded on a magnetic tape wound into a roll having a diameter, comprising an erasing coil defining a space therein, the space having a width shorter than the diameter of the magnetic tape roll and a length longer than the diameter of the magnetic tape roll, means for moving the magnetic tape roll intermittently to different erasing positions in a predetermined sequence so that the magnetic tape roll has different portions placed in the space at the respective erasing positions, means for producing a ringing signal to the erasing coil to provide a magnetic field in the space so as to perform one erasing operation cycle for erasing information recorded on the magnetic tape roll each time the magnetic tape roll is placed at one of the erasing positions, said means for moving the magnetic tape roll including a movable member having a surface portion on which the magnetic tape roll is placed at a predetermined position, and means for moving the movable member intermittently in a direction to bring the magnetic tape roll from one of the erasing positions to another upon completion of each erasing operation cycle, and means for measuring the diameter of the magnetic tape roll placed on the surface portion, and means for determining the erasing positions based on the measured magnetic tape roll diameter.

9. An erasing apparatus for erasing information recorded on a magnetic tape wound into a roll having a diameter, comprising an erasing coil defining a space therein, the space having a width shorter than the diameter of the magnetic tape roll and a length longer than the diameter of the magnetic tape roll, means for moving the magnetic tape roll intermittently to different erasing positions in a predetermined sequence so that the magnetic tape roll has different portions placed in the space at the respective erasing positions, means for producing a ringing signal to the erasing coil to provide a magnetic field in the space so as to perform one erasing operation cycle for erasing information recorded on the magnetic tape roll each time the magnetic tape roll is placed at one of the erasing positions, said means for moving the magnetic tape roll including a movable member having a surface portion on which the magnetic tape roll is placed at a predetermined position, and means for moving the movable member intermittently in a direction to bring the magnetic tape roll from one of the erasing positions to another upon completion of each erasing operation cycle, and means for measuring the diameter of the magnetic tape roll placed on the surface portion, means for calculating a number of the erasing positions based on the measured magnetic tape roll diameter, and means for determining the erasing positions based on the calculated erasing position number.

10. The erasing apparatus as claimed in claim 9, further including means for displaying a digit corresponding to the calculated erasing position number.

11. The erasing apparatus as claimed in claim 10, further including means for decreasing the displayed digit each time one erasing operation cycle is completed to indicate a number of remaining erasing operation cycles.

* * * * *